US011422854B2

(12) United States Patent
Du et al.

(10) Patent No.: US 11,422,854 B2
(45) Date of Patent: Aug. 23, 2022

(54) CROSS-COMPILATION, ORCHESTRATION, AND SCHEDULING FOR IN-MEMORY DATABASES AS A SERVICE

(71) Applicant: SAP SE, Walldorf (DE)

(72) Inventors: Long Du, Xi'an (CN); Le Zhang, Xi'an (CN); Yu Wang, Xi'an (CN)

(73) Assignee: SAP SE, Walldorf (DE)

( * ) Notice: Subject to any disclaimer, the term of this patent is extended or adjusted under 35 U.S.C. 154(b) by 342 days.

(21) Appl. No.: 16/801,760

(22) Filed: Feb. 26, 2020

(65) Prior Publication Data

US 2021/0263769 A1  Aug. 26, 2021

(51) Int. Cl.
*G06F 3/00* (2006.01)
*G06F 9/48* (2006.01)
*G06F 16/22* (2019.01)
*G06F 8/41* (2018.01)
*G06F 9/54* (2006.01)

(52) U.S. Cl.
CPC .......... *G06F 9/4881* (2013.01); *G06F 8/41* (2013.01); *G06F 9/541* (2013.01); *G06F 16/22* (2019.01); *G06F 2209/486* (2013.01)

(58) Field of Classification Search
CPC combination set(s) only.
See application file for complete search history.

(56) References Cited

U.S. PATENT DOCUMENTS

| 2015/0363598 | A1* | 12/2015 | Xu | G06F 21/563 |
| | | | | 726/23 |
| 2017/0169124 | A1* | 6/2017 | Reshadi | G06F 16/173 |
| 2020/0211149 | A1* | 7/2020 | Sigatapu | G06F 9/3867 |

FOREIGN PATENT DOCUMENTS

| CN | 111984195 A | * | 11/2020 | |
| WO | WO-2016109277 A1 | * | 7/2016 | G06F 8/34 |

OTHER PUBLICATIONS

Tim Seckinger, Compile-time abstraction of JavaScript mocking libraries powering a domain-specific language for interaction testing. (Year: 1997).*

* cited by examiner

*Primary Examiner* — Lechi Truong
(74) *Attorney, Agent, or Firm* — Schwegman Lundberg & Woessner, P.A.

(57) ABSTRACT

In an example embodiment, a new solution is provided for an in-memory database provided in a cloud as a service that enables "job cross running" instead of "parallel job running." Specifically, job scripts are clustered based on a shared service. A primary job script in the cluster is compiled and executed, but secondary job scripts in the cluster are not compiled until after the execution of the primary job script has begun. A mock library is inserted into each of the secondary job scripts to cause service calls for the shared service in the secondary job scripts to be replaced with mock service calls. The secondary job scripts are then scheduled and executed, and upon completion the primary job script is permitted to delete the shared service.

17 Claims, 7 Drawing Sheets

CROSS-COMPILATION, ORCHESTRATION, AND SCHEDULING FOR IN-MEMORY DATABASES AS A SERVICE

TECHNICAL FIELD

This document generally relates to in-memory database as a service administration. More specifically, this document relates to cross-compilation, orchestration, and scheduling for in-memory databases as a service on a cloud platform.

BACKGROUND

An in-memory database as a service (also known as an in-memory database as a service management system on a cloud platform) is a type of database management system that primarily relies on main memory for computer data storage and computation.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
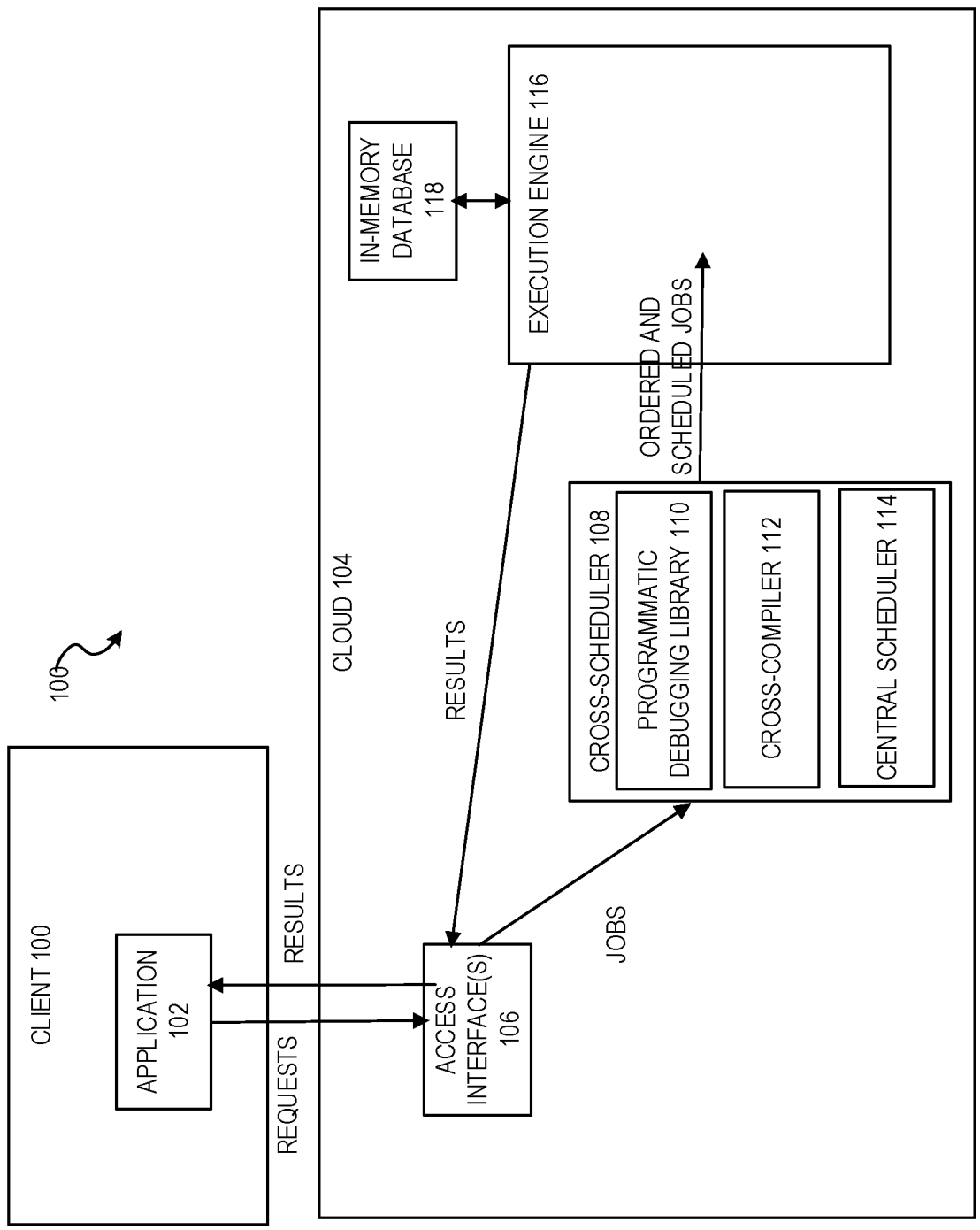
FIG. 1 is a block diagram illustrating a system for scheduling jobs for an in-memory database in a cloud environment, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

It is contrasted with database management systems that employ a disk storage mechanism. In-memory databases are traditionally faster than disk storage databases because disk access is slower than memory access. One example in-memory database is the HANA® database from SAP SE, of Frankfurt Germany.

One implementation of in-memory databases is to place them in a cloud and allow access to the cloud database as a service. For the HANA® cloud, this is known as HANA® as a service (HaaS). This allows customers to leverage the in-memory data processing and advanced analytic capabilities in the cloud.

Such services may allow applications to be developed using specialized in-memory database extended application services and deployed to a Cloud Foundry environment. Cloud Foundry is an open source, multi-cloud application platform as a service that allows for continuous delivery as it supports a full application development lifecycle, from initial deployment through testing stages to deployment. Container cloud Foundry utilizes a container-based architecture that runs application in any programming language over a variety of cloud service providers.

Job scheduling in Cloud Foundry can be technically challenging. A monolithic cluster schedule architecture is used to manage the scheduling of all possible jobs simultaneously, which makes it difficult to scale as the complexity (and number of concurrent users) of applications and services becomes greater. These monolithic schedulers use a single, centralized scheduling algorithm for all jobs. An alternative would be a two-level scheduler that have a single active resource manager that offers computing resources to multiple parallel and independent scheduler frameworks. This encounters technical problems, however, as it only works well for resource allocation. Specifically, in-memory database service creation and deletion always takes too long a time. The other problem is that some resource requests from some jobs cannot be satisfied because the independent scheduler framework believes there are no available resources when another independent scheduler framework could offer the same resource, as a developer may not provide a configuration file for detailed resource request, thus it is difficult for such a scheduler to estimate the resource quota.

What is needed is a solution that solves these technical problems.

In an example embodiment, a new solution is provided for an in-memory database provided in a cloud as a service that enables "job cross running" instead of "parallel job running." Specifically, job scripts are clustered based on a shared service. A primary job script in the cluster is compiled and executed, but secondary jobs scripts in the cluster are not compiled until after the execution of the primary job script has begun. A mock library is inserted into each of the secondary job scripts to cause service calls for the shared service in the secondary job scripts to be replaced with mock service calls. The secondary job scripts are then scheduled and executed, and upon completion the primary job script is permitted to delete the shared service.

In one example embodiment, each instance of the in-memory database is embedded in a running container, such as a Docker® container. Configuration files are embedded in a container runtime. In this embodiment, a cross-scheduling strategy is used that clusters jobs with similar service requests. A job request may include the operations of service creation, deletion, start, stop, backup, restore, and/or others.

FIG. 1 is a block diagram illustrating a system 100 for scheduling jobs for an in-memory database in a cloud environment, in accordance with an example embodiment. A client 100 is a computing device that runs an application 102. The client 100 computing device may be, for example, a desktop computer, a laptop computer, or a mobile device such as a tablet or smart phone. The application 102 may be, for example, a front end portion of an application that runs on a server device (not pictured) in a cloud 104. In other embodiments, however, the application 102 may be a self-contained full application.

In the cloud 104, one or more access interfaces 106 may receive requests from the application 102 on the client 100 (as well as from requests from applications on other clients). The one or more access interfaces 106 may take the form of one or more application program interfaces (APIs) that are called by the application 102. The one or more access interfaces 106 may cause the invocation of one or more jobs which then need to be scheduled for execution. Each of these jobs may be represented by a different job script that defines the instructions that are executed when the corresponding job is executed. These jobs may be sent to a cross-scheduler 108. The cross-scheduler includes a programmatic debugging library 110, a cross-compiler 112, and a central scheduler 114. The cross-compiler 112 compiles job scripts that share a similar service request, such as calling the same in-memory database instance.

As described in more detail later, the cross-compiler 112 compiles a primary job script from a cluster of job scripts, but waits to compile the secondary job scripts in the cluster of job scripts until after the primary job script has begun execution. Furthermore, the cross-compiler 112 adds code from the programmatic debugging library 110, specifically a mock library of code, to each of the secondary job scripts. This mock library of code causes certain service calls, such as service creation and service deletion calls, corresponding to the shared service in the cluster, to be replaced with mock calls. The central scheduler 114 analyzes the job scripts, causes execution of the primary job script by an execution engine 116, but hold completion of execution of the primary job script (specifically halting the execution of the primary job script just before a service deletion call in the primary job script is executed). The secondary job scripts are then executed by the execution engine 116, and their mock deletion calls to the shared service are tracked so that the central scheduler 114 knows when all of the secondary job scripts have completed their mock deletion calls to the shared service. Once these have been completed, the central scheduler permits the primary job script to delete the shared service.

In FIG. 1, the shared service is access to the same in-memory database 118, and thus the primary job script and the secondary job scripts in this cluster all make calls to the in-memory database. In a more specific example embodiment, the in-memory database may be a HANA instance or a HaaS instance.

In an example embodiment, job scripts are written in the Python language. In an example embodiment, a python debugger (PDB) is used to interactively control the job execution automatically. Specifically, the programmatic interface library 104 controls the PDB execution, which sends commands and fetches output with a specific Application Program Interface (API).

Figure 2:
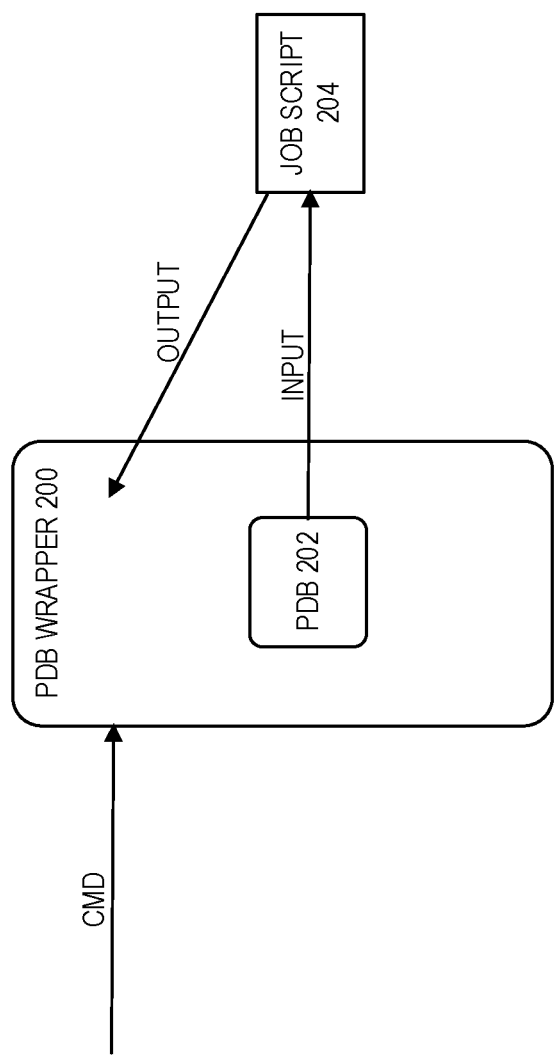
FIG. 2 is a block diagram illustrating a programmatic PDB controller in accordance with an example embodiment.

In the programmatic interface library 104, PDB is run as a subprocess, which sends commands and receives structured output. When a new object is created, the PDB subprocess is created by default by the initial constructor function, and this PDB subprocess is attached to the job script needed to be "debugged." The reason "debugged" is in quotes is that in an example embodiment the PDB subprocess is not just used to debug the job script but to actively modify it to allow for cross-scheduling of jobs. FIG. 2 is a block diagram illustrating a programmatic PDB controller in accordance with an example embodiment. Specifically, the programmatic PDB controller acts as a PDB wrapper 200 around the PDB 202. Commands, such as those received from a scheduler, are received by the programmatic PDB wrapper 200 and used to have the PDB 202 generate input to the appropriate job script 204 to modify the job script 204. The job script 204 then sends output to the programmatic PDB wrapper 200.

Some of these modifications are general in nature. Specifically, the original input/output streams can be replaced. While the input/output here is in block mode, the standard error descriptor (stderr) cannot be distinguished from the standard output descriptor (stdout). Thus, the modes of these two descriptors is changed to nonblock mode, which makes the output not buffered in the operating system. The output can be read directly in an output PIPE. Additionally, the srdin/stdout/stderr descriptors are distinguished as the file handler. Each input/output is bundled with a specific file handler so that every time the input/output is read, the file handler is scanned and used to read the specific content.

In some instances the outputs cannot be obtained in the limited amount of time provided as the job keeps running and there is continuous output. In such cases, a timeout flag can be set.

Additionally, several signals, such as SIGINT, can be used to terminate/recycle the PDF subprocess immediately so that it does not become an orphan process.

In accordance with an example embodiment, a solution is provided that shares the in-memory database instances between as many jobs as possible, to increase the scheduling performance dramatically. In order to accomplish this, in an example embodiment the job script that creates a service that includes an in-memory database instance needs to be modified to not delete the service right after the job execution. Subsequent job scripts that utilize the same service need to be modified to reuse the previously created service instead of creating their own. For simplicity, the first job script that uses a particular service containing a particular in-memory database will be called the primary job script for that service, while subsequent job scripts that utilize the same service will be called the secondary job scripts.

In practice, this may be performed by first clustering all of the job scripts that utilize the same in-memory database instance. A configuration file may be used to select a primary job script from the job scripts in a cluster, and the remaining job scripts in the cluster are secondary job scripts. The primary job script is compiled. The secondary job scripts within each cluster can have its code automatically modified by importing a mock library at the beginning of the scripts, and compilation of the secondary job scripts are delayed. This mock library acts to, within the secondary job scripts, facilitate the modification of actual service creation calls into mock service creation calls and the modification of actual deletion calls into mock service deletion calls. These mock calls only simulate the original function calls but do not actually perform any of their executions. As such, the deletion of the service in the primary job scripts is simulated but not actually performed.

This essentially blocks service creation and deletion (for the in-memory database services, anyway) in the secondary job scripts.

This process may be called cross compilation, because compilation stops after the primary service is created and then the secondary job scripts are compiled at runtime.

The primary job script does not get modified, but is carefully scheduled. Specifically, the scheduler (and the PDB controller in some embodiments) will control the primary job's execution such as by, for example, holding its execution right before it gets to the delete service call in the primary job script. The scheduler counts the successes of the secondary job script executions and decide whether to let the primary job script delete its service.

At runtime, the jobs may be clustered, this time based on a different factor than used to cluster the job scripts for cross compilation. In an example embodiment, this factor may be the general function of the job (as indicated by the API used to call each job). In an example embodiment, three function categories may be used: read-only, database writes, and in-memory database as-a-service writes. Job scheduling can then be performed based on these job types. This is called cross running job scheduling. For example, read-only jobs may be scheduled in parallel as they do not interfere with each others' running, and write jobs may be scheduled after the read-only jobs. Since all the job scripts except the primary one are compiled dynamically, once all of the secondary job scripts have executed their mock deletion, the scheduler can perform a real deletion of the service.

Figure 3:
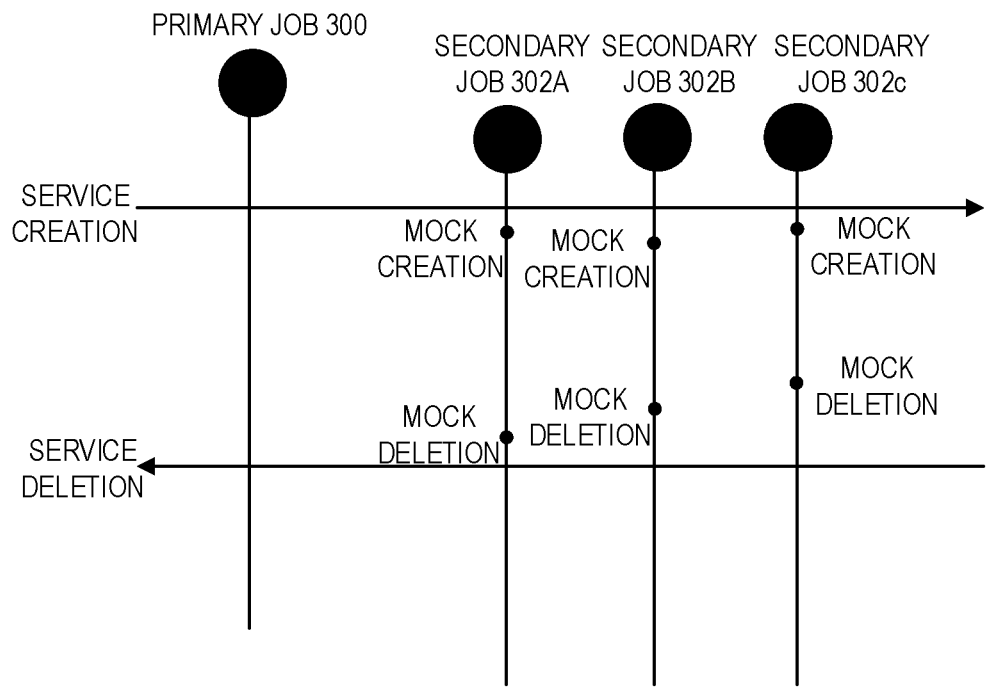
FIG. 3 is a workflow diagram illustrating cross-compiled jobs in accordance with an example embodiment.
Figure 4:
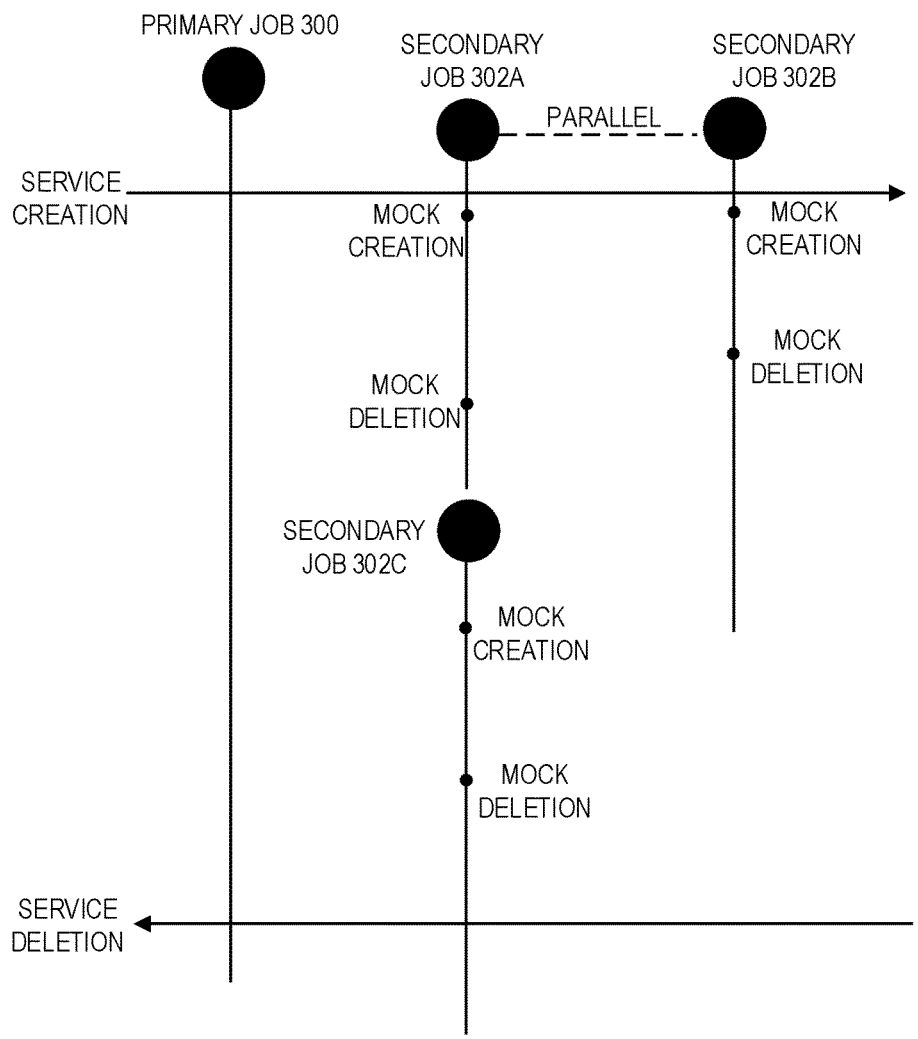
FIG. 4 is a workflow diagram illustrating cross-compiled jobs that are also scheduled based on clustering of the APIs used to call the jobs, in accordance with an example embodiment.

This process is depicted in FIGS. 3 and 4. FIG. 3 is a workflow diagram illustrating cross-compiled jobs in accordance with an example embodiment. Here, primary job 300 is invoked first, and the job script associated with the primary job 300 causes a particular service creation for a service utilized by secondary job 302A, 302B, and 302C. The job scripts corresponding to the secondary jobs 302A, 302B, and 302C are then dynamically compiled to cause mock service creation, reusing the service created by the primary job 300. A count may be maintained of all of these mock service creations. This count may then be decremented as each of the secondary jobs 302A, 302B, and 302C perform mock deletion of the service. Once that count indicates that all of the secondary jobs 302A, 302B, 302C have performed mock deletion, then the service may be deleted.

FIG. 4 is a workflow diagram illustrating cross-compiled jobs that are also scheduled based on clustering of the APIs used to call the jobs, in accordance with an example embodiment. Here, the secondary jobs 302A and 302B were classified as read-only jobs, and thus are scheduled in parallel and prior to secondary job 302C, which is a database write or in-memory database-as-a-service write.

Figure 5:
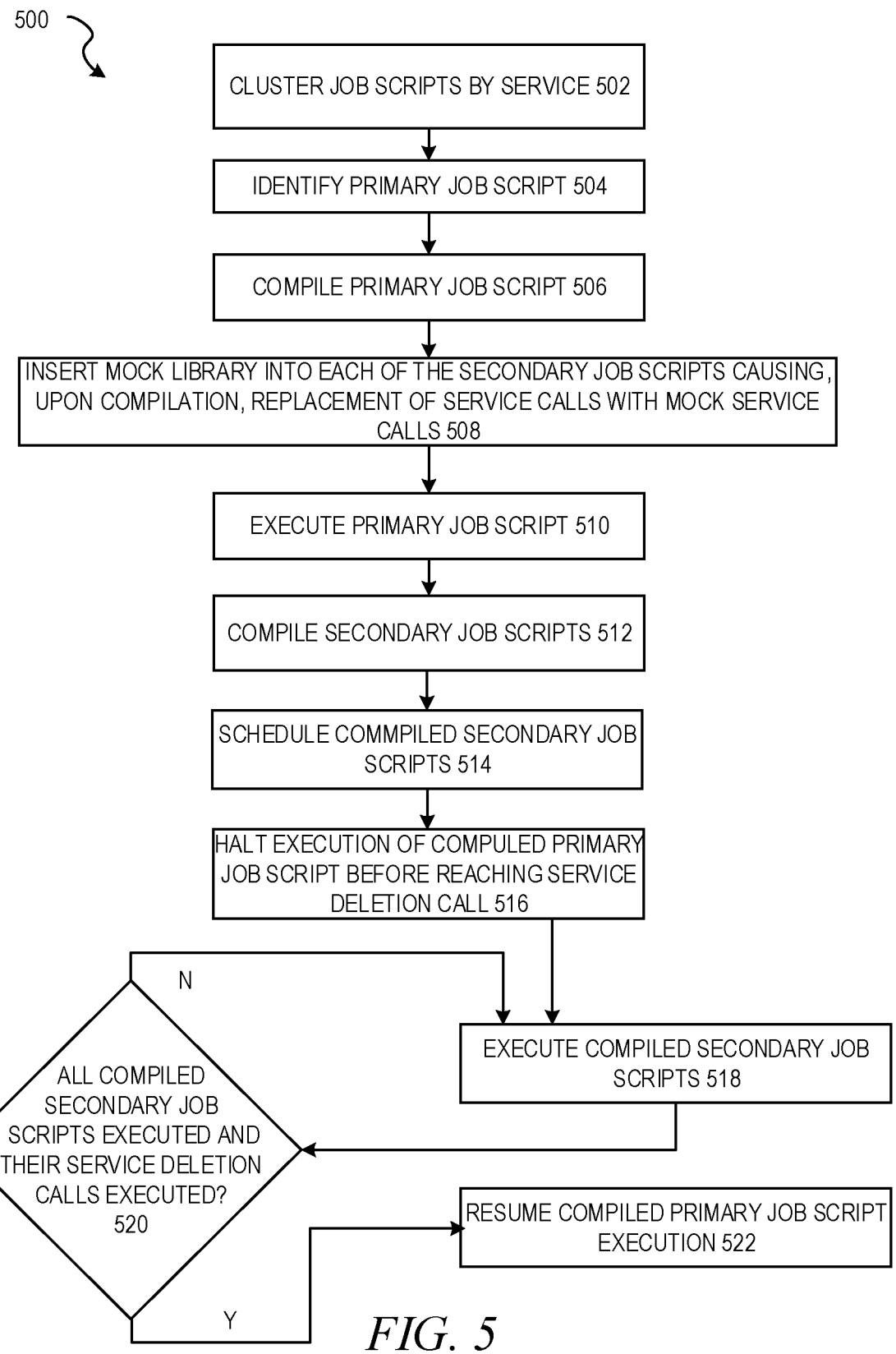
FIG. 5 is a flow diagram illustrating a method for scheduling compiled job scripts in a computer system in accordance with an example embodiment.

FIG. 5 is a flow diagram illustrating a method 500 for scheduling compiled job scripts in a computer system in accordance with an example embodiment. At operation 502, a plurality of job scripts are clustered together based on each of the plurality of job scripts invoking a particular service. In an example embodiment this particular service may be an in-memory database instance. At operation 504, a primary job script may be identified in the plurality of job scripts, with all other job scripts in the plurality of job scripts being secondary job scripts. This operation may be aided by the use of a configuration file specifying rules for election of the primary job script. At operation 506, the primary job script may be compiled.

At operation 508, a mock library may be inserted into each of the secondary job scripts, the mock library including script commands that, when compiled, modify any service creation calls for the particular service in the corresponding secondary job script into mock service creation calls and modify any service deletion calls for the particular service in the corresponding secondary job into mock service deletion calls.

At operation 510, the compiled primary job script is executed. At operation 512, the secondary job scripts are compiled after execution of the compiled primary job script has been initiated, causing the corresponding service calls in the secondary job scripts to be replaced with mock service calls. At operation 514, the secondary job scripts may be scheduled.

At operation 516 the execution of the compiled primary job script is halted before reaching the service deletion call in the compiled primary job script. At operation 518, the compiled secondary job scripts are executed. At operation 520, it is determined whether all of the compiled secondary job scripts have been executed and their mock service deletion calls for the particular service have been executed. If not, the method 500 loops back to operation 518. If so, execution of the compiled primary job script is resumed at operation 522, causing the execution of the service deletion call.

EXAMPLES

Example 1. A system comprising:
at least one hardware processor; and
a computer-readable medium storing instructions that, when executed by the at least one hardware processor, cause the at least one hardware processor to perform operations comprising:
clustering a plurality of job scripts together based on each of the plurality of job scripts invoking a particular service, each job script including a plurality of instructions to be executed by a computer to execute a job;
identifying a primary job script in the plurality of job scripts, with all other job scripts in the plurality of job scripts being secondary job scripts;
compiling the primary job script;
inserting a mock library into each of the secondary job scripts, the mock library including script commands that, when compiled, modify any service creation calls for the particular service in the corresponding secondary job script into mock service creation calls and modify any service deletion calls for the particular service in the corresponding secondary job into mock service deletion calls;
executing the compiled primary job script;
compiling the secondary job scripts after execution of the compiled primary job script has been initiated; and
scheduling the secondary job scripts.

Example 2. The system of Example 1, wherein the compiled primary job script includes a service deletion call for the particular service and the operations further comprise:
halting execution of the compiled primary job script before reaching the service deletion call in the compiled primary job script;
determining that all of the compiled secondary job scripts have been executed and their mock service deletion calls for the particular service have been executed; and
in response to the determination, resuming execution of the compiled primary job script.

Example 3. The system of Example 2, wherein the determining includes maintaining a count of compiled secondary job scripts and decrementing the count each time a compiled secondary job script has its corresponding mock service deletion call for the particular service executed, wherein when the count reaches zero it is determined that all of the mock service deletion calls for the particular service in the compiled secondary job scripts have been executed.

Example 4. The system of any of Examples 1-3, wherein the scheduling comprises clustering the compiled secondary job scripts based on job type.

Example 5. The system of Example 4, wherein the job types include read-only jobs and database write jobs.

Example 6. The system of Example 4, wherein the job type is determined based on which application program interface (API) was used to call the corresponding compiled secondary job script.

Example 7. The system of any of Examples 1-6, wherein the particular service is an in-memory database service.

Example 8. A method comprising:

clustering a plurality of job scripts together based on each of the plurality of job scripts invoking a particular service, each job script including a plurality of instructions to be executed by a computer to execute a job;

identifying a primary job script in the plurality of job scripts, with all other job scripts in the plurality of job scripts being secondary job scripts;

compiling the primary job script;

inserting a mock library into each of the secondary job scripts, the mock library including script commands that, when compiled, modify any service creation calls for the particular service in the corresponding secondary job script into mock service creation calls and modify any service deletion calls for the particular service in the corresponding secondary job into mock service deletion calls;

executing the compiled primary job script;

compiling the secondary job scripts after execution of the compiled primary job script has been initiated; and scheduling the secondary job scripts.

Example 9. The method of Example 8, wherein the compiled primary job script includes a service deletion call for the particular service and the method further comprises:

halting execution of the compiled primary job script before reaching the service deletion call in the compiled primary job script;

determining that all of the compiled secondary job scripts have been executed and their mock service deletion calls for the particular service have been executed; and in response to the determination, resuming execution of the compiled primary job script.

Example 10. The method of Example 9, wherein the determining includes maintaining a count of compiled secondary job scripts and decrementing the count each time a compiled secondary job script has its corresponding mock service deletion call for the particular service executed, wherein when the count reaches zero it is determined that all of the mock service deletion calls for the particular service in the compiled secondary job scripts have been executed.

Example 11. The method of any of Examples 8-10, wherein the scheduling comprises clustering the compiled secondary job scripts based on job type.

Example 12. The method of Example 11, wherein the job types include read-only jobs and database write jobs.

Example 13. The method of Example 11, wherein the job type is determined based on which application program interface (API) was used to call the corresponding compiled secondary job script.

Example 14. The method of any of Examples 8-13, wherein the particular service is an in-memory database service.

Example 15. A non-transitory machine-readable medium storing instructions which, when executed by one or more processors, cause the one or more processors to perform operations comprising:

clustering a plurality of job scripts together based on each of the plurality of job scripts invoking a particular service, each job script including a plurality of instructions to be executed by a computer to execute a job;

identifying a primary job script in the plurality of job scripts, with all other job scripts in the plurality of job scripts being secondary job scripts;

compiling the primary job script;

inserting a mock library into each of the secondary job scripts, the mock library including script commands that, when compiled, modify any service creation calls for the particular service in the corresponding secondary job script into mock service creation calls and modify any service deletion calls for the particular service in the corresponding secondary job into mock service deletion calls;

executing the compiled primary job script;

compiling the secondary job scripts after execution of the compiled primary job script has been initiated; and scheduling the secondary job scripts.

Example 16. The non-transitory machine-readable medium of Example 15, wherein the compiled primary job script includes a service deletion call for the particular service and the operations further comprise:

halting execution of the compiled primary job script before reaching the service deletion call in the compiled primary job script;

determining that all of the compiled secondary job scripts have been executed and their mock service deletion calls for the particular service have been executed; and in response to the determination, resuming execution of the compiled primary job script.

Example 17. The non-transitory machine-readable medium of Example 16, wherein the determining includes maintaining a count of compiled secondary job scripts and decrementing the count each time a compiled secondary job script has its corresponding mock service deletion call for the particular service executed, wherein when the count reaches zero it is determined that all of the mock service deletion calls for the particular service in the compiled secondary job scripts have been executed.

Example 18. The non-transitory machine-readable medium of any of Examples 15-17, wherein the scheduling comprises clustering the compiled secondary job scripts based on job type.

Example 19. The non-transitory machine-readable medium of Example 18, wherein the job types include read-only jobs and database write jobs.

Example 20. The non-transitory machine-readable medium of Example 18, wherein the job type is determined based on which application program interface (API) was used to call the corresponding compiled secondary job script.

Figure 6:
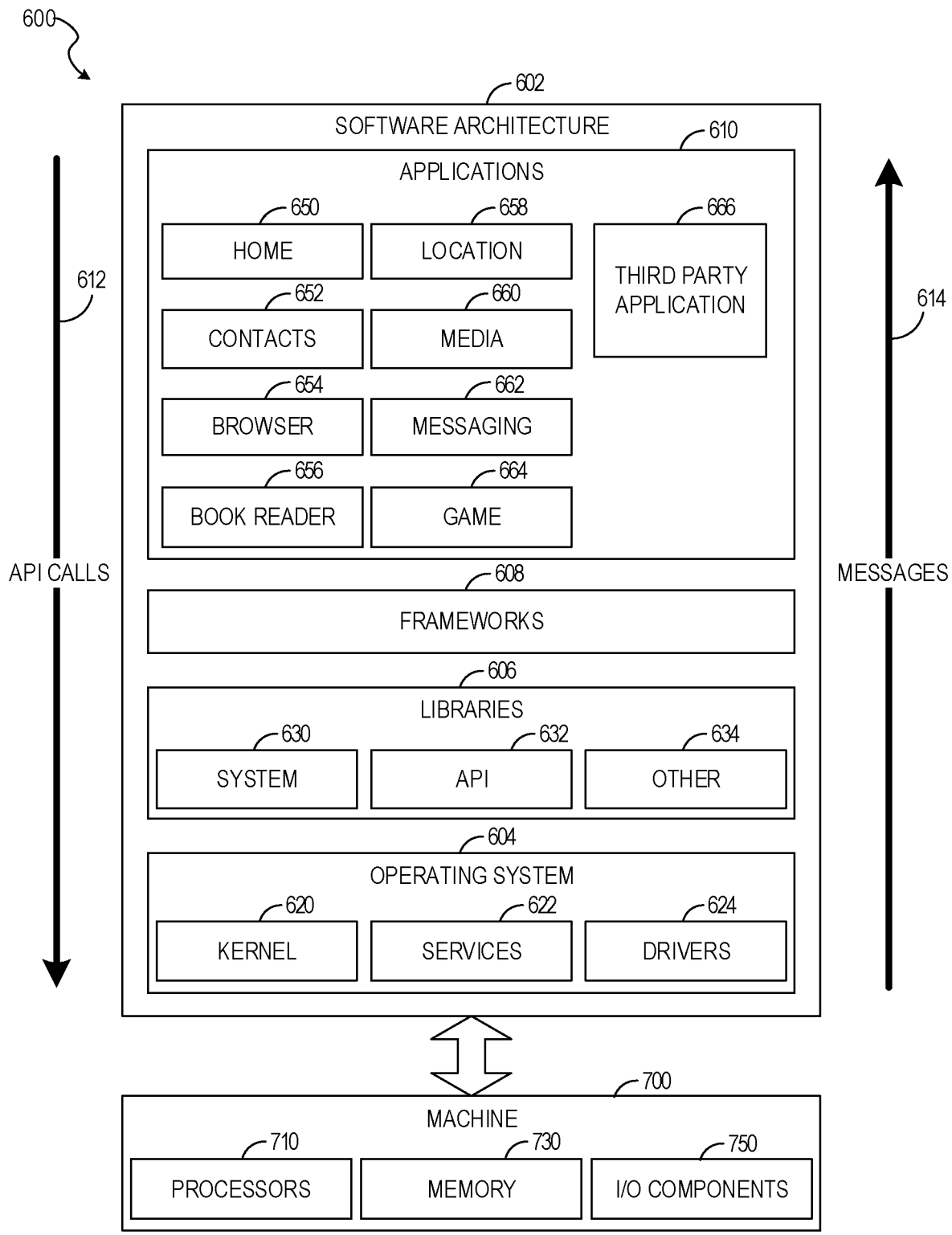
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
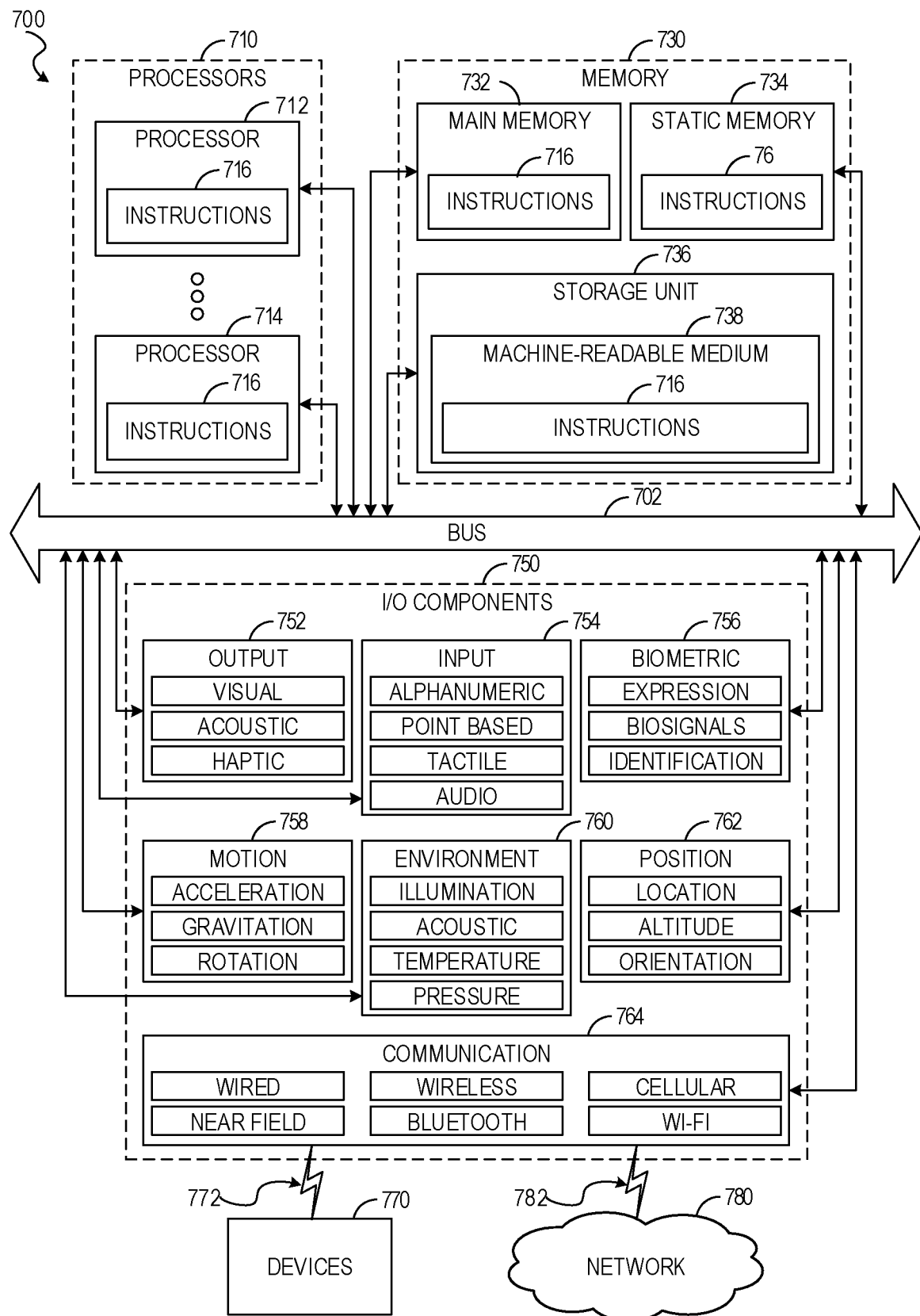
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising: at least one hardware processor; and a computer-readable medium storing instructions that, when executed by the at least one hardware processor, cause the at least one hardware processor to perform operations comprising: clustering a plurality of job scripts together based on each of the plurality of job scripts invoking a particular service, each job script including a plurality of instructions to be executed by a computer to execute a job; identifying a primary job script in the plurality of job scripts, with all other job scripts in the plurality of job scripts being secondary job scripts; compiling the primary job script; inserting a mock library into each of the secondary job scripts, the mock library including script commands that, when compiled, modify any service creation calls for the particular service in the corresponding secondary job script into mock service creation calls and modify any service deletion calls for the particular service in the corresponding secondary job into mock service deletion calls; executing the compiled primary job script; compiling the secondary job scripts after execution of the compiled primary job script has been initiated; and scheduling the secondary job scripts;
    wherein the compiled primary job script includes a service deletion call for the particular service and the operations further comprise: halting execution of the compiled primary job script before reaching the service deletion call in the compiled primary job script; determining that all of the compiled secondary job scripts have been executed and their mock service deletion calls for the particular service have been executed; and in response to the determination, resuming execution of the compiled primary job script.

2. The system of claim 1, wherein the determining includes maintaining a count of compiled secondary job scripts and decrementing the count each time a compiled secondary job script has its corresponding mock service deletion call for the particular service executed, wherein when the count reaches zero it is determined that all of the mock service deletion calls for the particular service in the compiled secondary job scripts have been executed.

3. The system of claim 1, wherein the scheduling comprises clustering the compiled secondary job scripts based on job type.

4. The system of claim 3, wherein the job types include read-only jobs and database write jobs.

5. The system of claim 3, wherein the job type is determined based on which application program interface (API) was used to call the corresponding compiled secondary job script.

6. The system of claim 1, wherein the particular service is an in-memory database service.

7. A method comprising: clustering a plurality of job scripts together based on each of the plurality of job scripts invoking a particular service, each job script including a plurality of instructions to be executed by a computer to execute a job; identifying a primary job script in the plurality of job scripts, with all other job scripts in the plurality of job scripts being secondary job scripts; compiling the primary job script; inserting a mock library into each of the secondary job scripts, the mock library including script commands that, when compiled, modify any service creation calls for the particular service in the corresponding secondary job script into mock service creation calls and modify any service deletion calls for the particular service in the corresponding secondary job into mock service deletion calls; executing the compiled primary job script; compiling the secondary job scripts after execution of the compiled primary job script has been initiated; and scheduling the secondary job scripts;
    wherein the compiled primary job script includes a service deletion call for the particular service and the operations further comprise: halting execution of the compiled primary job script before reaching the service deletion call in the compiled primary job script; determining that all of the compiled secondary job scripts have been executed and their mock service deletion calls for the particular service have been executed; and in response to the determination, resuming execution of the compiled primary job script.

8. The method of claim 7, wherein the determining includes maintaining a count of compiled secondary job scripts and decrementing the count each time a compiled secondary job script has its corresponding mock service deletion call for the particular service executed, wherein when the count reaches zero it is determined that all of the mock service deletion calls for the particular service in the compiled secondary job scripts have been executed.

9. The method of claim 7, wherein the scheduling comprises clustering the compiled secondary job scripts based on job type.

10. The method of claim 9, wherein the job types include read-only jobs and database write jobs.

11. The method of claim 9, wherein the job type is determined based on which application program interface (API) was used to call the corresponding compiled secondary job script.

12. The method of claim 7, wherein the particular service is an in-memory database service.

13. A non-transitory machine-readable medium storing instructions which, when executed by one or more processors, cause the one or more processors to perform operations comprising: clustering a plurality of job scripts together based on each of the plurality of job scripts invoking a particular service, each job script including a plurality of instructions to be executed by a computer to execute a job; identifying a primary job script in the plurality of job scripts, with all other job scripts in the plurality of job scripts being secondary job scripts; compiling the primary job script; inserting a mock library into each of the secondary job scripts, the mock library including script commands that, when compiled, modify any service creation calls for the particular service in the corresponding secondary job script into mock service creation calls and modify any service deletion calls for the particular service in the corresponding secondary job into mock service deletion calls; executing the compiled primary job script; compiling the secondary job scripts after execution of the compiled primary job script has been initiated; and scheduling the secondary job scripts;

wherein the compiled primary job script includes a service deletion call for the particular service and the operations further comprise: halting execution of the compiled primary job script before reaching the service deletion call in the compiled primary job script; determining that all of the compiled secondary job scripts have been executed and their mock service deletion calls for the particular service have been executed; and in response to the determination, resuming execution of the compiled primary job script.

14. The non-transitory machine-readable medium of claim 13, wherein the determining includes maintaining a count of compiled secondary job scripts and decrementing the count each time a compiled secondary job script has its corresponding mock service deletion call for the particular service executed, wherein when the count reaches zero it is determined that all of the mock service deletion calls for the particular service in the compiled secondary job scripts have been executed.

15. The non-transitory machine-readable medium of claim 13, wherein the scheduling comprises clustering the compiled secondary job scripts based on job type.

16. The non-transitory machine-readable medium of claim 15, wherein the job types include read-only jobs and database write jobs.

17. The non-transitory machine-readable medium of claim 15, wherein the job type is determined based on which application program interface (API) was used to call the corresponding compiled secondary job script.

* * * * *